Sept. 29, 1959 H. PELPHREY 2,906,147
ROLL FOR FORMING TOOTHED ELEMENTS
Filed Nov. 18, 1955 4 Sheets-Sheet 1

INVENTOR.
Harry Pelphrey.
BY
Harness, Dickey & Pierce
ATTORNEYS

Sept. 29, 1959

H. PELPHREY 2,906,147

ROLL FOR FORMING TOOTHED ELEMENTS

Filed Nov. 18, 1955

INVENTOR.
Harry Pelphrey
BY
Harness, Dickey & Pierce
ATTORNEYS.

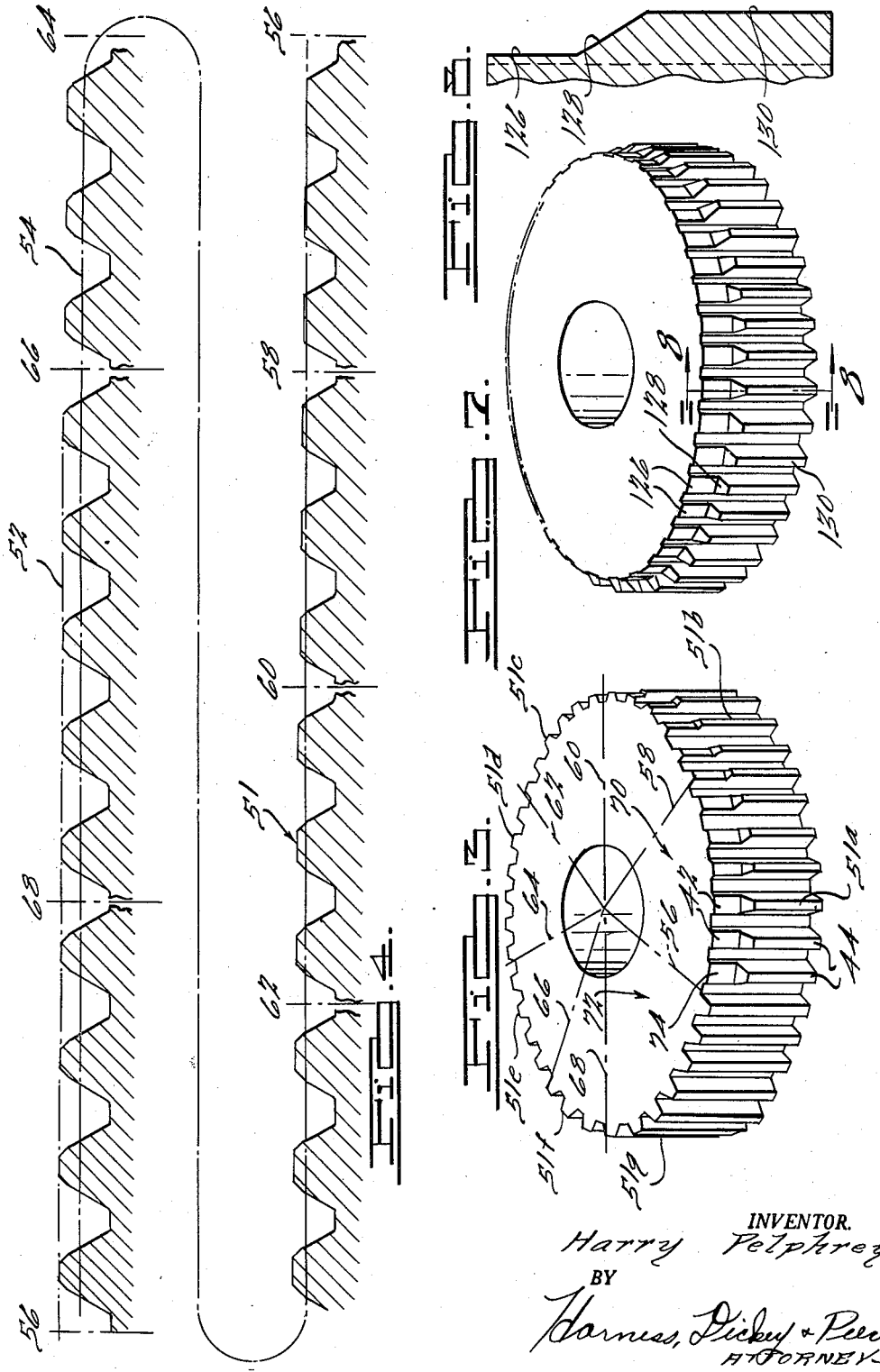

Sept. 29, 1959  H. PELPHREY  2,906,147
ROLL FOR FORMING TOOTHED ELEMENTS
Filed Nov. 18, 1955  4 Sheets-Sheet 4
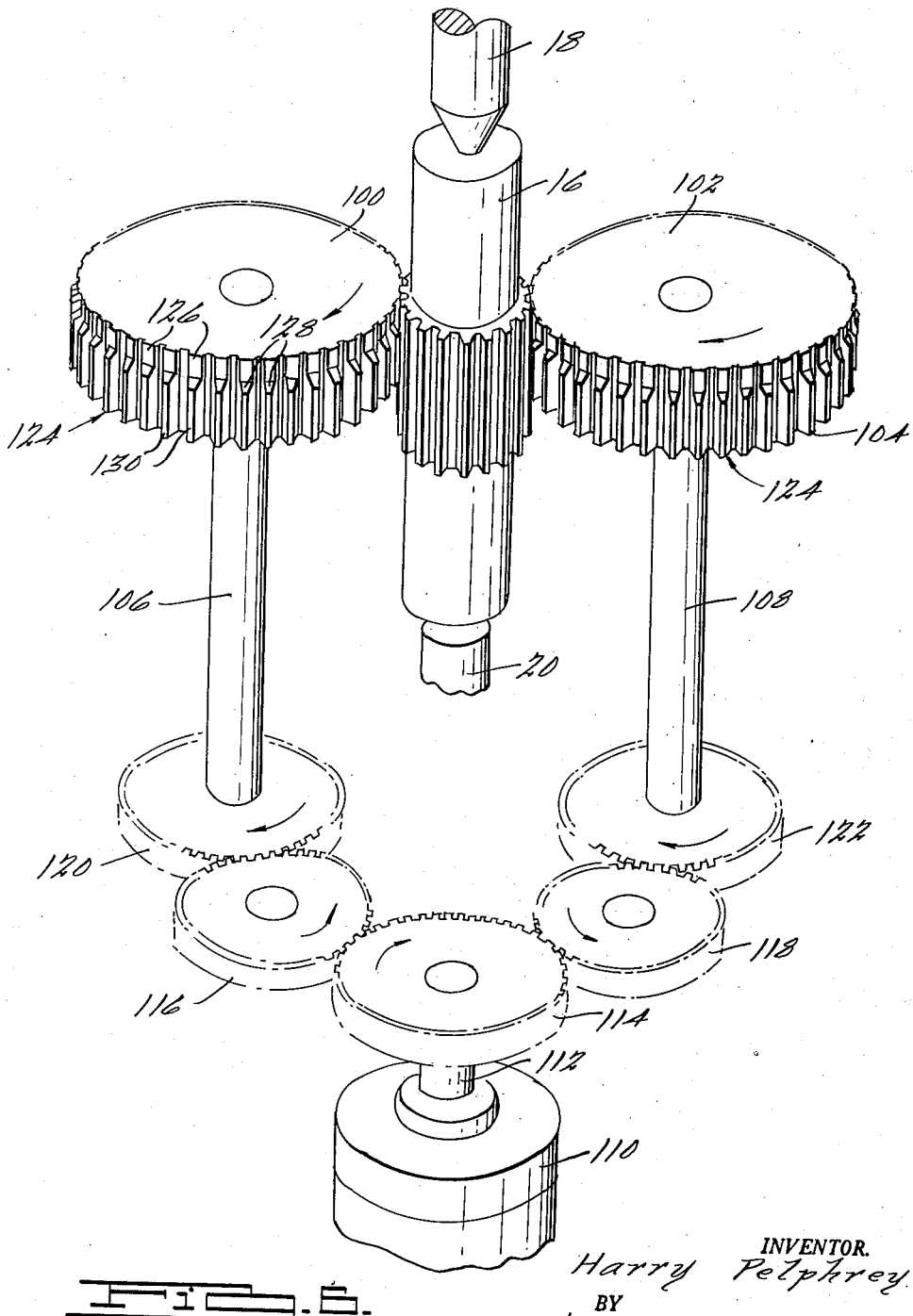
INVENTOR.
Harry Pelphrey
BY
Harness, Dickey & Pierce
ATTORNEYS

United States Patent Office 2,906,147
Patented Sept. 29, 1959

2,906,147
ROLL FOR FORMING TOOTHED ELEMENTS

Harry Pelphrey, Detroit, Mich., assignor to Michigan Tool Company, Detroit, Mich., a corporation of Delaware Application November 18, 1955, Serial No. 547,766

1 Claim. (Cl. 80—23)

This invention relates to methods and apparatus for forming toothed elements and, more particularly, to an improved method and improved apparatus for rotatably generating teeth on toothed elements such as gears, splines and the like.

An object of the invention is to increase the speed of production, improve the quality of and reduce the cost of manufacturing gears, splines and the like.

Another object of the invention is to provide an improved method and improved apparatus for rotatably generating teeth on gears, splines and the like with a minimum expenditure of time, labor and expense.

Another object of the invention is to provide improved apparatus incorporating improved means for accurately generating teeth on toothed elements.

Another object of the invention is to provide improved apparatus for rotatably generating teeth that is economical to manufacture and assemble, durable, efficient and reliable in operation.

Another object of the invention is to provide improved apparatus incorporating improved means for correcting errors, such as errors in tooth spacing, tooth profile and helix angle of the teeth on gears, splines and the like.

The above as well as other objects and advantages of the present invention will become apparent from the following description, the appended claim and the accompanying drawings wherein:

Fig. 4 is a developed sectional view of the teeth on one section of the rotatable tool illustrated in Fig. 3;

Fig. 5 is a fragmentary view of a typical involute toothed element that can be formed by the method and apparatus of the present invention;

Fig. 6 is a perspective view of another embodiment of the invention;

Fig. 7 is an enlarged perspective view of one of the tools illustrated in Fig. 6, showing the same removed from the driving spindle; and Fig. 8 is an enlarged sectional view of a portion of the tool illustrated in Fig. 7, taken on the line 8—8 thereof.

Figure 1:
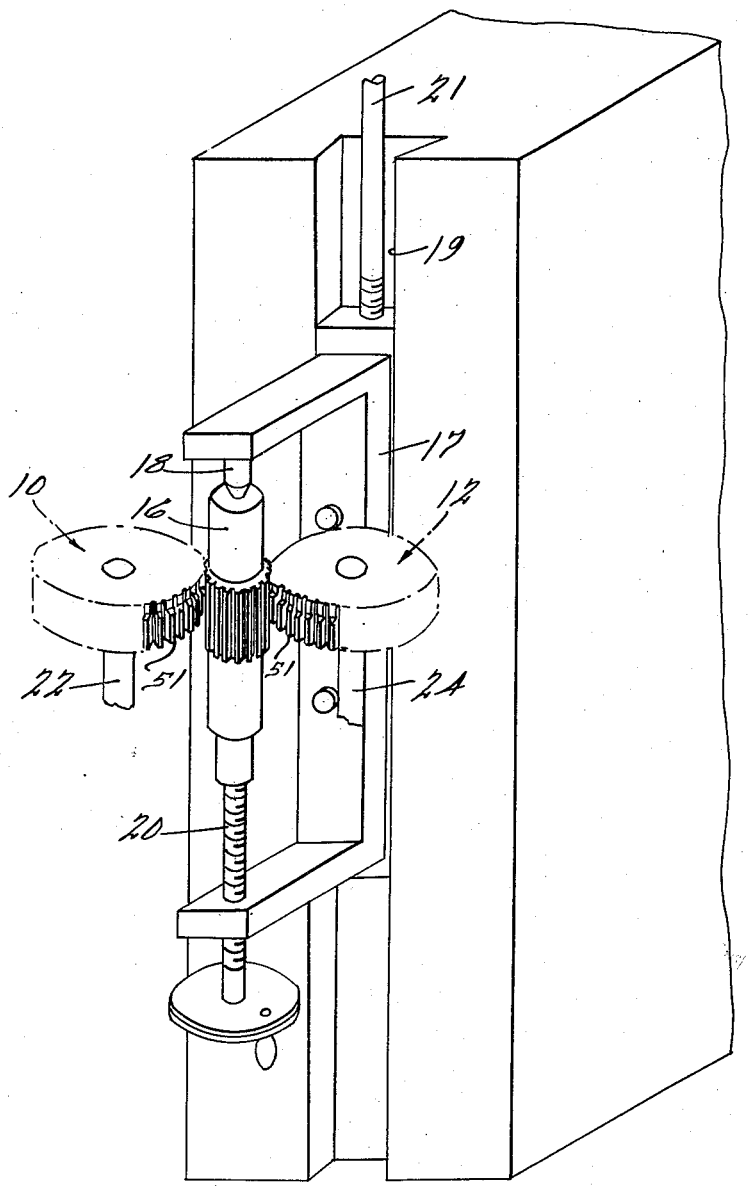
Figure 1 is a fragmentary perspective view of one embodiment of the invention, the driving means and one tool being removed therefrom for purposes of clarity.

In carrying out the invention, the workpiece on which the teeth are to be formed is subjected to the action of a plurality of rotatable tools, each having teeth conjugate to the teeth to be formed on the workpiece. This may be done when the workpiece is at ambient temperature or when the workpiece or a portion thereof is heated to an elevated temperature, as by the use of induction heating equipment, and when no prior tooth forming operations have been performed on the workpiece.

Referring to the drawings, one embodiment of the invention is illustrated in Figs. 1 through 4 and is comprised of rotatable tools 10, 12 and 14. A workpiece 16 is shown in position between the rotatable tools 10, 12 and 14 whereby the tools form teeth on the periphery of the workpiece. In this embodiment of the invention, the workpiece 16 is supported by means which permits the workpiece to rotate freely about its longitudinal axis when urged to do so by the tools 10, 12 and 14, and which permits feeding of the workpiece intermittently in a longitudinal direction substantially parallel to the axes of rotation of the tools 10, 12 and 14. To illustrate such means, there is shown a pair of centers 18 and 20, which may be considered as a part of the apparatus embodying the present invention. The centers 18 and 20 are carried by a support member 17, the support member, in turn, being slidably mounted on ways 19 and a feed screw 21 being provided which threadably engages the support member 17 and which permits the intermittent feeding of the workpiece 16 longitudinally relative to the tools 10, 12 and 14. In addition, the center 20 may be made adjustable relative to the center 18 so that varying lengths of workpieces may be handled by the apparatus.

The tools 10, 12 and 14 are substantially identical in construction and are provided with teeth on the periphery thereof which engage the surface of the workpiece 16 and which will be described hereinafter in greater detail.

Means is provided to drive the tools 10, 12 and 14 simultaneously in the same direction. This means is shown as comprising a plurality of drive shafts 22, 24 and 26 which carry the tools 10, 12 and 14, respectively, the tools being keyed or otherwise fixed to the drive shafts. The drive shaft 26 is connected to an electric motor 28, and the drive shaft 26 carries a driving gear 30 which serves to drive the shafts 22 and 24 in the same direction as the shaft 26 through idler gears 32 and 34 and driven gears 36 and 38. This last-mentioned gear train is also constructed and arranged so that the tools 10, 12 and 14 are driven simultaneously at the same speed in the same direction, a substantially 1:1 gear ratio being effected between the driving gear 30 and the driven gears 36 and 38.

Figures 2, 3:
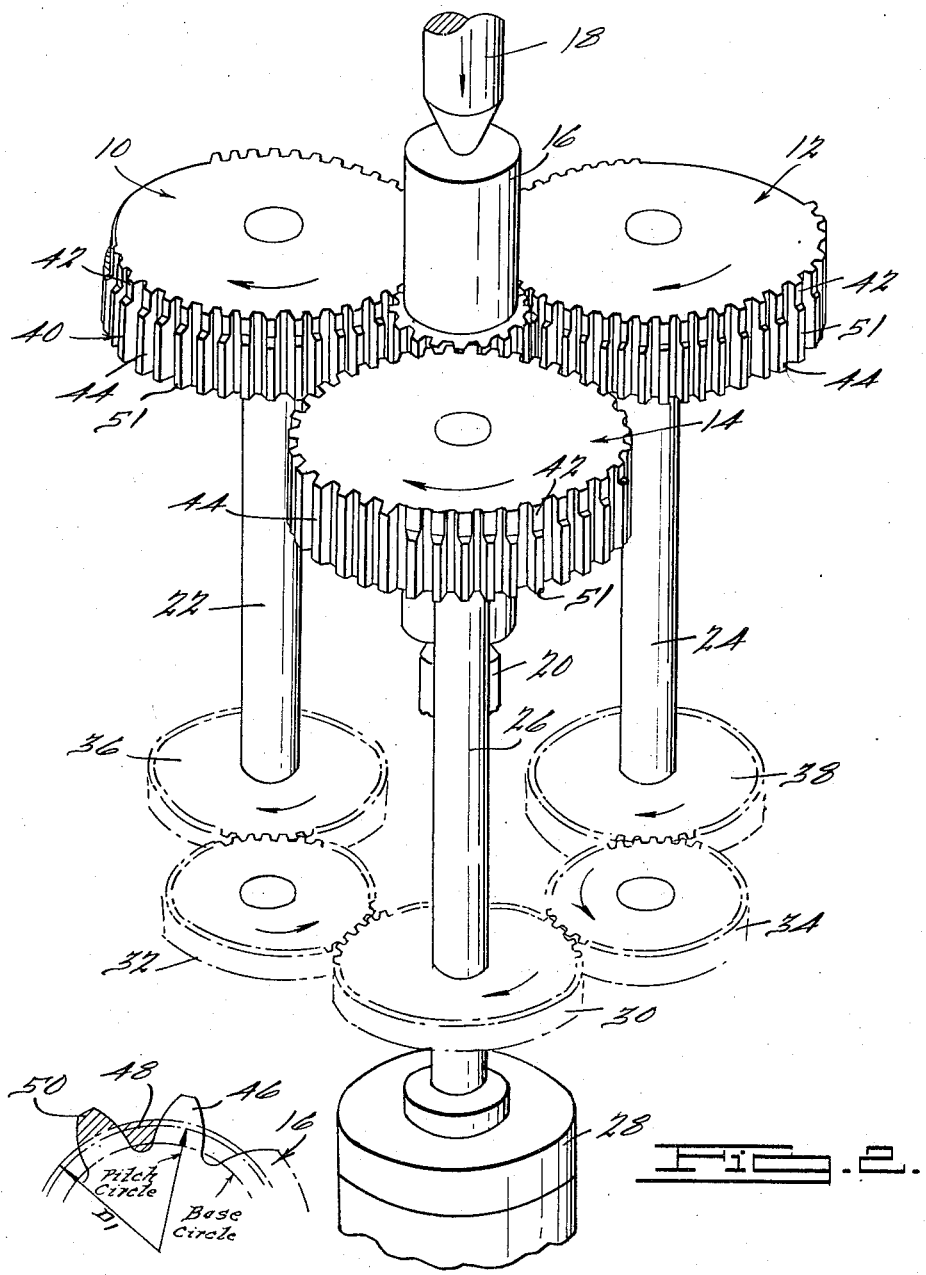
Fig. 2 is an enlarged view of a portion of the structure illustrated in Figure 1.
Fig. 3 is an enlarged perspective view of one of the rotatable tools illustrated in Figs. 1 and 2, showing the same removed from the driving spindle.

In forming teeth, splines and the like on the workpiece 16, the tools 10, 12 and 14 are mounted in equally angularly spaced relationship, as shown in Fig. 2, and the workpiece is mounted on the centers 18 and 20 so that the workpiece is permitted to be rotated by the tools 10, 12 and 14. In this embodiment of the invention, the working faces 40 of each of the rotatable tools 10, 12 and 14 may be considered to be divided into two sections 42 and 44 by a plane which passes through each tool perpendicular to the axis of rotation thereof, and the tools are located so that the spacing between the working faces 40 of the tools 10, 12 and 14 is less than the initial diameter of the workpiece 16 with the result that the shape of the faces 40 is impressed or conjugated on the periphery of the workpiece.

In rotatably generating teeth of the desired configuration on the workpiece 16, the material from which the workpiece is made, as, for example, wrought steel, will flow adjacent the surface of the workpiece in radial, tangential and axial directions so that grooves of less than the original diameter of the workpiece and teeth greater than the original diameter are formed on the workpiece. Where the final form of the workpiece is known and must be accurately maintained, this flow of material should be taken into account in selecting the diameter of that portion of the workpiece 16 which is subjected to the action of the tools 10, 12 and 14.

In Fig. 5, a common and important shape is illustrated that may be rolled by tools embodying the present invention, a portion of a cross section of a workpiece 16 being shown in finished form and having involute teeth 46 thereon. Since metal is not removed in the tooth forming operation, the diameter of the workpiece prior to the rolling cannot be either the final outside diameter nor the root diameter, and it is only by chance that it can properly be the pitch diameter. The rolling diameter $D_1$ of the workpiece 16 is selected so that the area 48 of displaced tooth material inside the $D_1$ periphery is equal to the area 50 of tooth material on a greater diameter than $D_1$. The diameter $D_1$, or substantially this diameter, is taken as the tool pitch diameter. The pressure angle of the teeth 51 of the tools 10, 12 and 14 at diameter $D_1$ is the angle whose cosine is $D/D_1$ multiplied by the cosine of the pressure angle at the pitch diameter of the teeth 46 where D is the pitch diameter of the workpiece 16. The base pitch of the tools and the workpiece are identical. The whole depth of at least some of the last teeth on the tools which engage the workpiece 16 is preferably substantially the same as that of the workpiece so that these tool teeth are substantially fully conjugate to the workpiece, sufficient clearance being provided to compensate for manufacturing tolerances, and the tools 10, 12 and 14 are spaced apart so that near the end of the rolling operation, the working faces provide a clearance substantially equal to the root diameter of the workpiece 16 less approximately three or four thousandths of an inch to compensate for elasticity of the members, compression of oil films under rolling pressure, and manufacturing tolerances of the workpieces.

If it is desired to positively drive the workpiece 16, as, for example, through gearing, rather than by the tools 10, 12 and 14, the angular velocities of the workpiece and the tools should, of course, be the same. It is also preferred that there be no reversal of direction of the tools relative to the workpiece during the formation of the teeth on the workpiece.

The spacing of the sections 42 of each of the tools 10, 12 and 14 radially of the workpiece is regulated so that the depth of the impression made in the workpiece 16 gradually increases as the rolling operation proceeds, and the sections 42 gradually approach closer to the longitudinal axis of the workpiece as each tool rotates through one revolution about its own axis. At present, it is preferred that the amount of approach be within the range of .0015–.004 inch per inch of curvilinear tool movement, with about .002 preferred. This approach may also be regarded as a .0015–.004 inch total feed of the workpiece across its diameter per inch of tool movement relative thereto. This approach of each section 42 of the tools radially toward the axis of the workpiece with increasing angular movement of the tools is preferably accomplished by varying the rate of curvature of the periphery of the section 42 of each tool uniformly, e.g. about .00066 inch per inch per tool, although it is within the broad purview of the invention to provide a variation in the rate of curvature in other ways. This variation in the rate of curvature can be obtained by varying the rate of curvature of the pitch line of the tool teeth in the section 42; by gradually increasing the height of the teeth in the section 42 while maintaining the pitch diameter substantially constant, or by a combination of the two methods.

In the embodiment of the invention illustrated in Figs. 1, 2 and 3, the pitch diameter of each of the rotatable tools 10, 12 and 14 is constant so that the pitch circle or pitch line of each tool is disposed concentrically about the axis of the tool.

In Fig. 4 a developed sectional view of the section 42 of each of the tools 10, 12 and 14 is shown. The line 52 is a reference line which corresponds to the addendum circle of the full sized teeth in the section 42 while the line 54 corresponds to the pitch line or pitch circle of the section 42. Since Fig. 4 is a developed view, the line 52 is parallel to the line 54 throughout the entire length of the section 42. The top lands of the teeth in the section 42 taper downwardly, as viewed in Fig. 4, the taper being effected by gradually removing the addenda of the teeth 51, as by grinding. Thus, the top lands of the teeth are disposed on a curve which is eccentric to the axis of each of the tools.

The section 42 of each of the tools may be considered as being divided into sectors by radially extending reference planes 56, 58, 60, 62, 64, 66 and 68, the sectors including a leading sector 70 and a trailing sector 72. The leading sector 70 is the sector which initially engages the workpiece, and the portion of the top land of the end tooth 74 which is disposed in the section 42 may be located substantially on the pitch line, as shown, or may be disposed one-half to a few thousandths of an inch radially outwardly from the pitch line. The portions of the teeth 51a in the section 42 are relatively shallow but rather thick and have sharp corners. The portions of the teeth 51b in the section 42 in the sector between the reference planes 58 and 60 are preferably provided with a small chamfer, e.g. .003 inch on 30 degrees relative to the line 54, as viewed in Fig. 4. The chamfer may be gradually increased as the height of the teeth increases in the section 42 to a size which is somewhat larger than the final chamfer, e.g. in the section 42 between the planes 60 and 62, the chamfer on the teeth 51c may be .004 inch on 30 degrees; between the planes 62 and 64, the chamfer on the teeth 51d may be .005 inch on 30 degrees; between the planes 64 and 66, the chamfer on the teeth 51e may be .006 on 30 degrees; and between the planes 66 and 68, the chamfer on the teeth 51f may be .007 inch on 30 degrees. The teeth in each of these sectors may be approximately equal in number, the number, of course, depending on the total taper and the circular pitch required. The portions of the teeth 51g in the section 42 in the trailing sector 72 between the planes 68 and 56 and the portions of the teeth 51 which are disposed in the section 44 are identical and give final form to the teeth on the workpiece. The portions of the teeth 51g in the section 42 as well as in the section 44 are full size and substantially fully conjugate but have a chamfer of .005 inch on 30 degrees.

The sharp corners of the portions of the teeth 51a in the section 42 tend to grip the workpiece and rotate it. In addition, the changing shape of the teeth in the section 42 corresponds substantially to the successive changes to be made in the surface of the workpiece as the teeth are formed on the workpiece.

In this embodiment of the invention, with the rotatable tools 10, 12 and 14 mounted on the drive shafts 22, 24 and 26, respectively, the teeth 51a in the leading sectors 70 of the sections 42 of each of the tools are disposed adjacent the axis of the centers 18 and 20 and on equally angularly spaced radii extending outwardly from the axis of the centers 18 and 20. The workpiece 16 is then mounted on the centers so that the lower end of the portion of the workpiece upon which the teeth are to be formed is disposed adjacent the upper side of the tools 10, 12 and 14, as viewed in Figs. 1 and 2. The workpiece is then fed longitudinally downwardly, as viewed in Figs. 1 and 2, a distance substantially equal to the width of the section 42. The motor 28 is then energized so that the tools 10, 12 and 14 rotate in a clockwise direction, the tools effecting the rotation of the workpiece in a counterclockwise direction, as viewed in Figs. 1 and 2. Since the spacing between the sections 42 is less than the diameter of the workpiece, the shape of the section 42 is conjugated on the periphery of that portion of the workpiece disposed intermediate the sections 42 of the tools. The tools 10, 12 and 14 are rotated through one revolution after which the motor 28 is de-energized, and the workpiece 16 is then fed longitudinally downwardly a distance substantially equal to the width of the section 42 so that the teeth conjugated by the section 42 during the first revolution of the tools engage the sections 44 of the tools while the portions of the teeth 74 in the section 42 of the tools engage the adjacent portion of the workpiece. The tools 10, 12 and 14 are then rotated through one complete revolution so that the sections 42 conjugate teeth on the portion of the workpiece in contact therewith. The workpiece is thus intermittently fed longitudinally downwardly and the tools intermittently rotated through one revolution until the teeth are formed on the workpiece to the desired width, teeth in the sectors 72 and in the sections 44 serving to impart final form to the teeth formed on the workpiece and to maintain the workpiece in the proper position relative to the tools.

Since three tools 10, 12 and 14 are utilized in this embodiment of the invention, it is not necessary to mount the workpiece 16 on centers to maintain the workpiece in contact with the tools, and it will be understood that other means which permits the workpiece to rotate relative to the tools may be utilized to effect the longitudinal feeding of the workpiece.

Another embodiment of the invention is illustrated in Figs. 6-8, and is comprised of a pair of rotatable tools 100 and 102. Fig. 6, the workpiece 16 is shown in position between the tools 100 and 102 whereby such tools form teeth on the periphery of the workpiece. In this embodiment of the invention, the workpiece is supported by the centers 18 and 20 which permit the workpiece to rotate freely about the longitudinal axis thereof, and the workpiece is fed continuously in a longitudinal direction substantially parallel to the axes of rotation of the tools 100 and 102. In this embodiment of the invention, the feed screw rotates continuously, rather than intermittently, as in the previously described embodiment of the invention.

The tools 100 and 102 are substantially identical in construction and are provided with teeth 104 on the periphery which engage the surface of the workpiece upon which teeth are to be formed and which will be described hereinafter in greater detail. Means is provided for driving the tools 100 and 102 simultaneously in the same direction. The driving means is shown as including a pair of spaced parallel drive shafts 106 and 108 which are preferably mounted on diametrically opposite sides of the centers 18 and 20. A conventional electric motor 110 is provided having a drive shaft 112 which carries a driving gear 114. The driving gear 114 serves to drive the shafts 106 and 108 in the same direction through idler gears 116 and 118 and driven gears 120 and 122 fixed to the shafts 106 and 108. The gear train is constructed and arranged so that the tools 100 and 102 are driven simultaneously at the same speed in the same direction.

In forming teeth, splines and the like on the workpiece 16, the tools 100 and 102 are preferably disposed on diametrically opposite sides of the workpiece, as shown in Fig. 6, and the workpiece is mounted on the centers 18 and 20 so that the workpiece is permitted to be rotated by the tools 100 and 102. In this embodiment of the invention, the working faces 124 of the tools 100 and 102 are divided into three sections 126, 128 and 130, and the tools are located so that the spacing between the working faces 124 is less than the initial diameter of the workpiece with the result that the configuration of the faces 124 is conjugated on the periphery of the workpieces.

The spacing of the sections 126, 128 and 130 of each of the tools 100 and 102 is regulated so that the depth of the impressions made in the workpiece gradually increases as the rolling operation proceeds, the working faces of the tools gradually approaching closer to the longitudinal axis of the workpiece as the workpiece is fed longitudinally relative to the tools in a direction substantially parallel to the axes of rotation of the tools.

As previously mentioned, it is preferred that the amount of approach be within the range of .0015–.004 inch of curvilinear tool movement relative to the workpiece, with about .002 preferred. In this embodiment of the invention, the approach of the working faces of the tools radially toward the axis of the workpiece with increasing longitudinal movement of the workpiece is accomplished by tapering the teeth 104 in the section 128 inwardly from the section 130 toward the section 126, the angle of the taper depending upon the desired rate of longitudinal feed of the workpiece and the speed of rotation of the tools 100 and 102. In this embodiment of the invention, the top lands of all of the teeth in the section 126 may be located substantially on a pitch line of the tools, or may be located one-half to a few thousandths of an inch radially outwardly from the pitch line. The teeth in the section 126 are relatively shallow and have sharp corners, the sharp corners on the teeth in the section 126 tending to grip the workpiece and rotate it. The teeth in the section 130 are full size and substantially fully conjugate and effect the final form of the teeth on the workpiece. The top lands of the teeth in the section 128 taper gradually outwardly from the pitch line of the tool toward the section 130, the taper being effected by gradually removing the addendum of each of the teeth, as by grinding, in the section 128 from the section 130 toward the section 126. The changing shape of the teeth in the section 128 corresponds substantially to the progressive changes to be made on the surface of the workpiece as the teeth are formed on the workpiece.

In the operation of this embodiment of the invention, the rotatable tools 100 and 102 are mounted on the drive shafts 106 and 108, respectively, on opposite sides of the axis of the centers 18 and 20, the tools being equally spaced from the axis of the centers. The workpiece is then mounted on the centers 18 and 20 so that the lower end of the portion of the workpiece upon which teeth are to be formed is disposed adjacent the sections 126 of the tools. The motor 110 is then energized so that the tools 100 and 102 rotate in a clockwise direction, as viewed in Fig. 6. At the same time, the workpiece 16 is fed continuously downwardly, as viewed in Fig. 6. Since the spacing between the sections 126 is less than the diameter of the workpiece, the shape of the teeth in the sections 126 is initially conjugated on the periphery of that portion of the workpiece which is in contact with the sections 126. As the workpiece is fed continuously downwardly, the shape of the tapered teeth in the section 128 is conjugated on the periphery of the workpiece and, as the workpiece continues to feed longitudinally, the teeth in the sections 130 contact the workpiece and impart the final form to the teeth on the workpiece. The workpiece thus feeds continuously downwardly and, at the same time, the tools 100 and 102 rotate continuously until the teeth are formed to the desired width on the workpiece.

While preferred embodiments of the invention have been shown and described, it will be understood that various changes and modifications may be made without departing from the spirit of the invention.

What is claimed is:

A roll tool for generating teeth on a workpiece comprising a cylindrical body having teeth projecting from its periphery, each tooth extending axially of the body parallel to the axis thereof and denoting leading ends for progressing into the work followed by trailing ends, the trailing ends of the teeth being all of full height and conjugate to the completed teeth of the workpiece, the leading ends of the teeth being successively reduced from full height down to substantially the surface of the cylindrical body so that the leading ends of the teeth in one revolution gradually penetrate the workpiece at successive depths until the full depth of penetration is reached.

References Cited in the file of this patent

UNITED STATES PATENTS

| | | |
|---|---|---|
| 1,558,086 | Gustavsen | Oct. 20, 1925 |
| 1,923,477 | Coda | Aug. 22, 1933 |
| 2,318,505 | Long | May 4, 1943 |
| 2,464,658 | Stiven | Mar. 15, 1949 |

FOREIGN PATENTS

| | | |
|---|---|---|
| 258,062 | Switzerland | May 2, 1948 |
| 884,944 | Germany | July 30, 1953 |
| 921,321 | Germany | Dec. 16, 1954 |